(12) United States Patent
Zhao et al.

(10) Patent No.: US 9,563,079 B2
(45) Date of Patent: Feb. 7, 2017

(54) METHOD FOR MANUFACTURING ALIGNMENT FILMS OF LIQUID CRYSTAL PANELS

(71) Applicant: SHENZHEN CHINA STAR OPTOELECTRONICS TECHNOLOGY CO., LTD., Shenzhen, Guangdong (CN)

(72) Inventors: Rentang Zhao, Guangdong (CN); Yanjun Song, Guangdong (CN); Chung-Ching Hsieh, Guangdong (CN)

(73) Assignee: SHENZHEN CHINA STAR OPTOELECTRONICS TECHNOLOGY CO., LTD., Shenzhen, Guangdong (CN)

(*) Notice: Subject to any disclaimer, the term of this patent is extended or adjusted under 35 U.S.C. 154(b) by 137 days.

(21) Appl. No.: 14/648,708

(22) PCT Filed: Feb. 12, 2015

(86) PCT No.: PCT/CN2015/072837
§ 371 (c)(1),
(2) Date: May 31, 2015

(87) PCT Pub. No.: WO2016/123817
PCT Pub. Date: Aug. 11, 2016

(65) Prior Publication Data
US 2016/0363819 A1 Dec. 15, 2016

(30) Foreign Application Priority Data
Feb. 6, 2015 (CN) .......................... 2015 1 0065263

(51) Int. Cl.
*G11B 7/1369* (2012.01)
*G02F 1/1337* (2006.01)
*G02F 1/1341* (2006.01)
*G02F 1/1333* (2006.01)

(52) U.S. Cl.
CPC ....... *G02F 1/133711* (2013.01); *G02F 1/1341* (2013.01); *G02F 1/133788* (2013.01); *G02F 2001/133354* (2013.01); *G02F 2001/133715* (2013.01)

(58) Field of Classification Search
CPC .......................... H01L 27/1262; G02F 1/1337
See application file for complete search history.

(56) References Cited

U.S. PATENT DOCUMENTS

2013/0120705 A1* 5/2013 Zhao ................ G02F 1/133788
349/191
2013/0163399 A1* 6/2013 Shiono ..................... B05D 5/00
369/112.02

* cited by examiner

Primary Examiner — Joseph L Williams
(74) Attorney, Agent, or Firm — Soroker Agmon Nordman

(57) ABSTRACT

A method for manufacturing alignment films of liquid crystal panel includes the steps of: injecting a liquid crystal mixture containing liquid crystal molecules and liquid crystal reactive monomers to form a liquid crystal cell; placing the liquid crystal cell in a first reaction machine to subject the same to a voltage, ultraviolet radiation, and a temperature, so that the liquid crystal reactive monomers produce a polymerization reaction; moving the liquid crystal cell to a second reaction machine after a first preset time period in order to subject the same to a voltage and a temperature to continue the polymerization reaction, and forming alignment films on inner surfaces of a first substrate and a second substrate, respectively.

18 Claims, 4 Drawing Sheets

METHOD FOR MANUFACTURING ALIGNMENT FILMS OF LIQUID CRYSTAL PANELS

FIELD OF THE INVENTION

The present invention relates to a technical field of liquid crystal manufacture, and in particular to a method for manufacturing alignment films of liquid crystal panels.

BACKGROUND OF THE INVENTION

In order to meet the requirement for developing large-size and wide angle LCD panels, multi-domain vertical alignment (MVA) mode has been widely used among the LCD panel manufacturers. MVA mode is formed with protrusions on the inner surface of substrate during a curing process of liquid crystal reactive monomers (RM), the protrusions forming a preset angle thus forming alignment films to deflect the liquid crystal toward a specific angle. MVA mode has the advantages of wide viewing angle, high image quality, and so on.

As shown in FIGS. 1A and 1B, both are schematic diagrams of alignment films forming processes. FIG. 1A is a first reaction machine providing a voltage (V), a first illumination of ultraviolet light lamp (UV1) and heat, so as to initiate a reaction of the liquid crystal reactive monomer 14 moving toward a first substrate 11 or a second substrate, and forming protrusions to form an alignment film 13 to deflect the liquid crystal molecules 12. Typically the voltage is no longer applied once the UV1 illumination has been completed, and the substrate is irradiated followed by a second ultraviolet light (UV2). As shown in FIG. 1B, a second reaction machine only provides the UV2, which is weaker than the UV1, so that the remaining RM 14 is completely reacted. Since a UV1 machine can only execute one exposure to one substrate throughout the process, the above step has become a bottleneck, affecting the production efficiency of the alignment films.

SUMMARY OF THE INVENTION

Accordingly, the present invention provides a method for manufacturing alignment films of liquid crystal panel, so as to solve the production bottleneck problem of the existing art caused by the time consumption in the first reaction machine.

In order to solve the above technical problem, one embodiment of the present invention provides the following solution:

A method for manufacturing alignment films of a liquid crystal panel, comprising the following steps: injecting a liquid crystal mixture between a first substrate and a second substrate, and stacking them together to form a liquid crystal cell, the liquid crystal mixture comprises liquid crystal molecules and liquid crystal reactive monomers; placing the liquid crystal cell in a first reaction machine to subject the same to a voltage, ultraviolet irradiation and a temperature provided by the first reaction machine, so as to generate a polymerization reaction for the liquid crystal reactive monomers, wherein the voltage provided by the first reaction machine is 7V to 50V, an illuminance of the ultraviolet irradiation is 0.05 to 120 mW/cm$^2$, and the temperature is 25° C. to 80° C.; determining whether a duration that the liquid crystal cell is placed in the first reaction machine reaches a first preset time period; moving the liquid crystal cell from the first reaction machine to a second reaction machine if the first preset time period is reached, to subject the liquid crystal cell to another voltage and another temperature provided by the second reaction machine in order to continue the polymerization reaction of the liquid crystal reactive monomers, wherein the voltage provided by the second reaction machine is 1V to 50V and the temperature is 10° C. to 10° C.; determining whether a duration that the liquid crystal cell is placed in the second reaction machine reaches a second preset time period; and moving the liquid crystal cell out of the second reaction machine if the second preset time period is reached, to form alignment films on inner surfaces of the first substrate and the second substrate, respectively.

Preferably, the second reaction machine comprises a conveyor belt for conveying the liquid crystal cell from an inlet to an outlet of the second reaction machine, and the polymerization reaction is completed in the second reaction machine.

Preferably, the conveyor belt has a length of 10 to 100 m.

Preferably, the second reaction machine is a multilayered structure furnace having 10 to 100 layers therein.

Preferably, before the step of injecting the liquid crystal mixture between the first substrate and the second substrate, the method further comprises the step of: preparing the liquid crystal mixture, wherein the proportion of the liquid crystal reactive monomers in the liquid crystal mixture is 2000 to 5000 ppm.

Preferably, the liquid crystal reactive monomers are aromatic compounds.

Preferably, the step of stacking the liquid crystal cell further comprises: offsetting the first substrate and the second substrate a predetermined distance to expose a voltage contact point on the second substrate for receiving the voltage provided by the first reaction machine or the second reaction machine.

Preferably, after the liquid crystal reactive monomers produce the polymerization reaction, the method further comprises the steps of: moving the liquid crystal reactive monomers toward the first substrate or the second substrate and forming protrusions; and forming a pre-tilt angel of the liquid crystal molecules under the effect of the protrusions.

In order to solve the above technical problem, another embodiment of the present invention provides the following solution:

A method for manufacturing alignment films of liquid crystal panel, comprising the following steps: injecting a liquid crystal mixture between a first substrate and a second substrate, and stacking them together to form a liquid crystal cell, the liquid crystal mixture comprises liquid crystal molecules and liquid crystal reactive monomers; placing the liquid crystal cell in a first reaction machine to subject the same to a voltage, ultraviolet irradiation, and a temperature provided by the first reaction machine, so as to generate a polymerization reaction for the liquid crystal reactive monomers; determining whether a duration that the liquid crystal cell is placed in the first reaction machine reaches a first preset time period; moving the liquid crystal cell from the first reaction machine to a second reaction machine if the first preset time period is reached, to subject the liquid crystal cell to another voltage and another temperature provided by the second reaction machine in order to continue the polymerization reaction of the liquid crystal reactive monomers, and forming alignment films on inner surfaces of the first substrate and the second substrate, respectively.

Preferably, the second reaction machine comprises a conveyor belt for conveying the liquid crystal cell from an inlet to an outlet of the second reaction machine, and the polymerization reaction is completed in the second reaction machine.

Preferably, the conveyor belt has a length of 10 to 100 m.

Preferably, the second reaction machine is a multilayered structure furnace having 10 to 100 layers.

Preferably, the method further comprises the following steps: determining whether a duration that the liquid crystal cell is placed in the second reaction machine reaches a second preset time period; and moving the liquid crystal cell out of the second reaction machine if the second preset time period is reached.

Preferably, the voltage provided by the first reaction machine is 7V to 50V, an illuminance of the ultraviolet irradiation is 0.05 to 120 mW/cm$^2$, and the temperature is 25° C. to 80° C.; the voltage provided by the second reaction machine is 1V to 50V, and the temperature is 10° C. to 100° C.

Preferably, the method further comprises the following steps: preparing the liquid crystal mixture, wherein the proportion of the liquid crystal reactive monomers in the liquid crystal mixture is 2000 to 5000 ppm.

Preferably, the liquid crystal reactive monomers are aromatic compounds.

Preferably, the step of stacking the liquid crystal cell further comprises: offsetting the first substrate and the second substrate a predetermined distance to expose a voltage contact point on the second substrate for receiving the voltage provided by the first reaction machine or the second reaction machine.

Preferably, after the liquid crystal reactive monomers generate the polymerization reaction, the method further comprises the steps of: moving the liquid crystal reactive monomers toward the first substrate or the second substrate and forming protrusions; and forming a pre-tilt angle of the liquid crystal molecules under the effect of the protrusions.

Compared with the conventional art, the present invention provides a polymerization reaction condition for the liquid crystal cell through the second reaction machine, so that the reaction time is shortened in the first reaction machine, and the production bottleneck is avoided, thereby shortening the preparation time.

BRIEF DESCRIPTION OF THE DRAWINGS

In order to illustrate embodiments of the present invention or technical solutions in the prior art more clearly, drawings required in the descriptions of the embodiments or the prior art will be described briefly hereinafter. Obviously, the drawings in the following description are only some embodiments of the present application, and those skilled in the art can also obtain other drawings from these drawings without any creative work.

DETAILED DESCRIPTION OF THE PREFERRED EMBODIMENTS

Please refer to the drawings, wherein the same symbols represent the same components. While the following description may contain specific details describing particular embodiments of the invention, this should not be construed as limitations to the other embodiments which are not described in the present invention.

Embodiment 1

Figure 2:
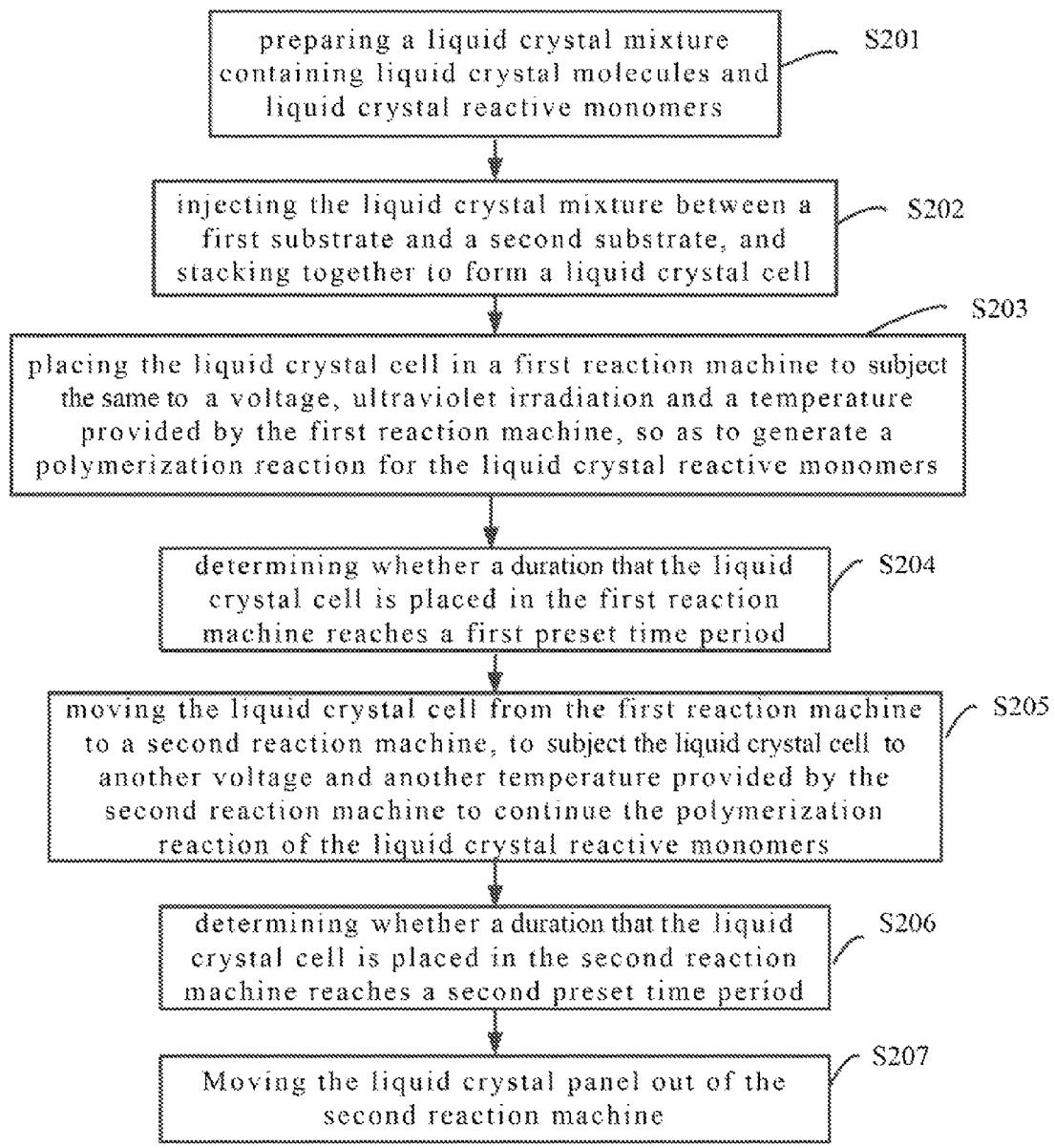
FIG. 2 is a schematic flow chart for manufacturing an alignment film provided by the embodiment 1 of the present invention.

Referring to FIG. 2, which is a schematic flow chart for manufacturing an alignment film of the present invention.

In step S201, preparing the liquid crystal mixture, the liquid crystal mixture comprises liquid crystal molecules and the liquid crystal reactive monomers.

It should be understood that the liquid crystal reactive monomers include aromatic compounds. The proportion of the liquid crystal reactive monomers in the liquid crystal mixture is 2000 to 5000 ppm (parts per million). A best alignment effect can be achieved after a polymerization reaction is completed.

In step S202, injecting a liquid crystal mixture between a first substrate and a second substrate, and stacking them together to form a liquid crystal cell.

It should be understood that the step of stacking the first substrate and the second substrate, further comprises: offsetting the first substrate and the second substrate a predetermined distance to expose a voltage contact point on the second substrate for receiving the voltage provided by the first reaction machine or the second reaction machine.

In step S203, placing the liquid crystal cell in the first reaction machine to subject the same to a voltage, ultraviolet radiation, and a temperature provided by the first reaction machine, so as to generate a polymerization reaction for the liquid crystal reactive monomers.

It should be understood that the voltage provided by the first reaction machine is 7V to 50V, an illuminance of the ultraviolet irradiation is 0.05 to 120 mW/cm$^2$, and the temperature is 25° C. to 80° C.

The voltage provided by the first reaction machine is transmitted through connecting to the voltage contact point mentioned above.

Figure 1A:
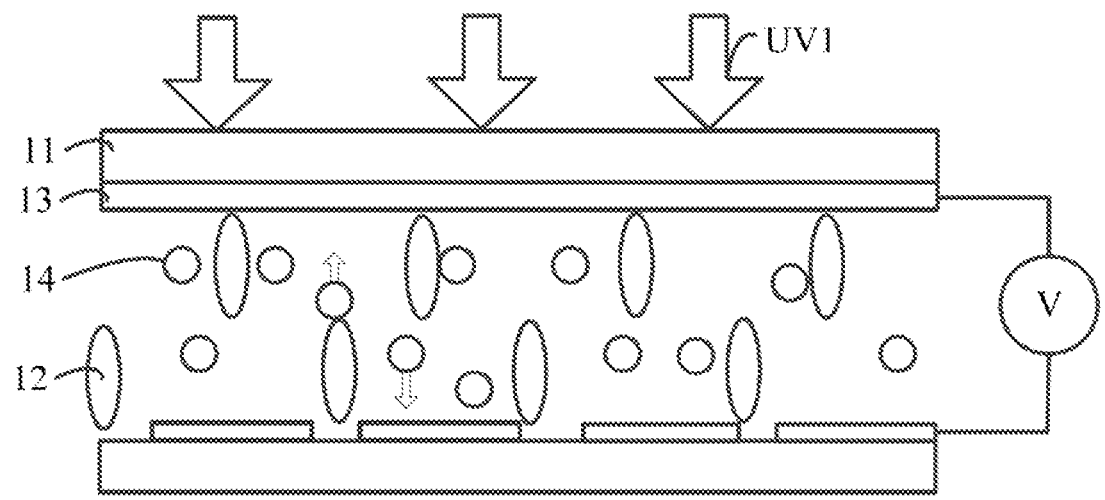
FIG. 1A is a schematic diagram of an alignment film forming process in a first reaction machine of the conventional art.
Figure 1B:
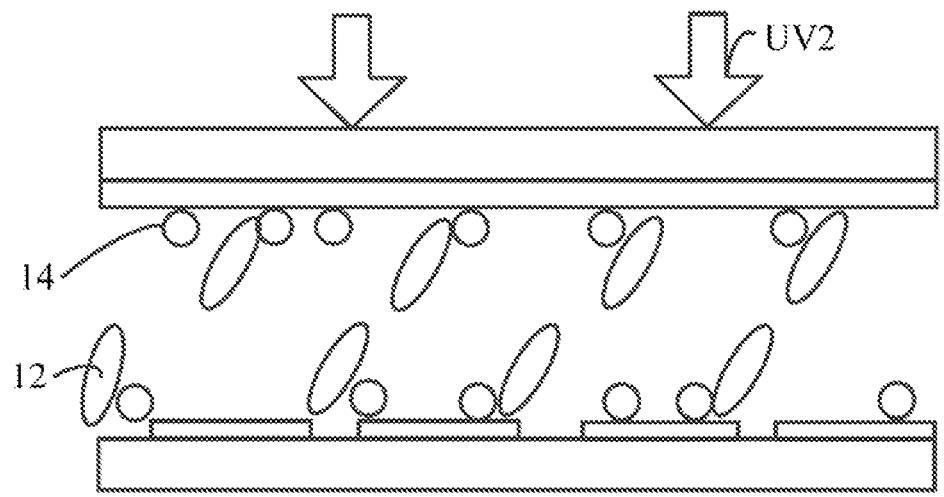
FIG. 1B is a schematic diagram of an alignment film forming process in a second reaction machine of the conventional art.

Referring FIG. 1A, the reaction process herein is similar to the conventional art, except that the reaction time is shortened. In the first reaction machine, the liquid crystal reactive monomers in the liquid crystal cell initiate the polymerization reaction, and form protrusions on the first substrate or the second substrate.

In step S204, determining whether a duration that the liquid crystal cell is placed in the first reaction machine reaches a first preset time period.

It should be understood that the setting of the first preset time period is based on a current condition that the polymerization reaction occurrence ratio of the liquid crystal reactive monomers, such as to reach a predetermined value range, like 65 to 80%, 60 to 70%, or 75 to 90%, which is not enumerated herein. Take 65 to 80% for example, in the current reaction condition, the corresponding reaction time period is 50 seconds.

In step S205, moving the liquid crystal cell from the first reaction machine to a second reaction machine if the first preset time period is reached, to subject the liquid crystal cell to another voltage and another temperature provided by the second reaction machine in order to continue the polymerization reaction of the liquid crystal reactive monomers; and forming alignment films on inner surfaces of the first substrate and the second substrate, respectively.

The second preset range comprises a voltage provided by the second reaction machine of 1V to 50V, and a temperature of 10° C. to 100° C. Wherein the voltage provided by the second reaction machine is transmitted through connecting to the voltage contact point mentioned above.

Under the effect of temperature and voltage, the polymerization reaction in the first reaction machine can be guaranteed to continue, the liquid crystal cells in the second reaction machine can also execute the reaction simultaneously, and the unit production time of the liquid crystal cells is relatively low. This will effectively shorten the reaction time in the first reaction machine, such that there is no longer a production bottleneck throughout the preparation process.

Figure 3A:
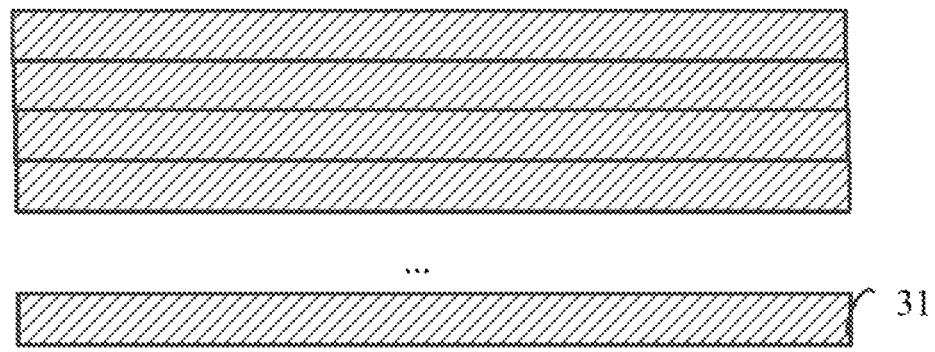
FIG. 3A is a schematic diagram of a second reaction machine provided by the embodiment 1 of the present invention.

Referring to FIG. 3A, which is a schematic diagram of a second reaction machine of the present invention. The second reaction machine 31 is a new second reaction machine model, which is a multilayered structure furnace having 10 to 100 layers therein, so that it is more convenient to accommodate the liquid crystal cells from the first reaction machine.

Figure 3B:
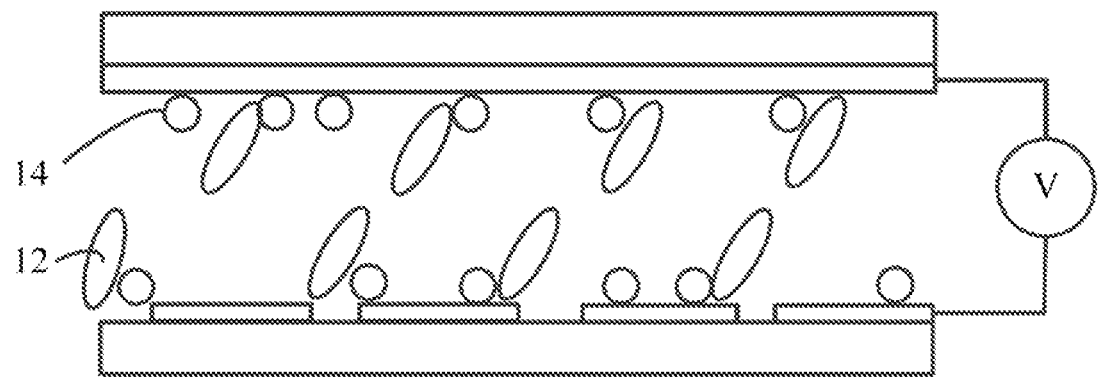
FIG. 3B is a schematic diagram of a forming process of the alignment film prepared in FIG. 3A.

Referring to FIG. 3B, which is a schematic diagram of a forming process of one of the alignment films prepared in FIG. 3A. The liquid reactive crystal monomers 14 continue the polymerization reaction in the second reaction machine, and form alignment films, such that the liquid crystal molecules 12 form a pre-tilt angle.

In step S206, determining whether a duration that the liquid crystal cell is placed in the second reaction machine reaches a second preset time period.

In step S207, moving the liquid crystal cell out of the second reaction machine if the second preset time period is reached.

The liquid crystal reactive monomers are moving toward the first substrate or the second substrate and forming protrusions when the polymerization reaction occurs; the liquid crystal molecules form a pre-tilt angle under the effect of the protrusions.

It should be understood that since the first reaction machine needs to provide ultraviolet radiation, in coordination with temperature and voltage to initiate the polymerization reaction of the liquid crystal monomer to form the pre-tilt angle, the illumination requirement of the ultraviolet radiation is more strict, high-cost instruments with high-precision should be adopted. While the second reaction machine only requires temperature and voltage to continue the polymerization reaction, in order to avoid free liquid crystal reactive monomers resulting in defects of the panel lighting, the second reaction machine can only adopt lower cost general equipment.

The present invention reduces the reaction time in the first reaction machine through a design of the second reaction machine. The second reaction machine has larger capacity, so the unit production time is very low. Although such a design increases one production step, the actual unit production time is reduced. The bottleneck in producing the alignment films of liquid crystal panel in the first reaction machine is avoided, and overall production efficiency of the liquid crystal panel is improved.

Embodiment 2

Figure 4:
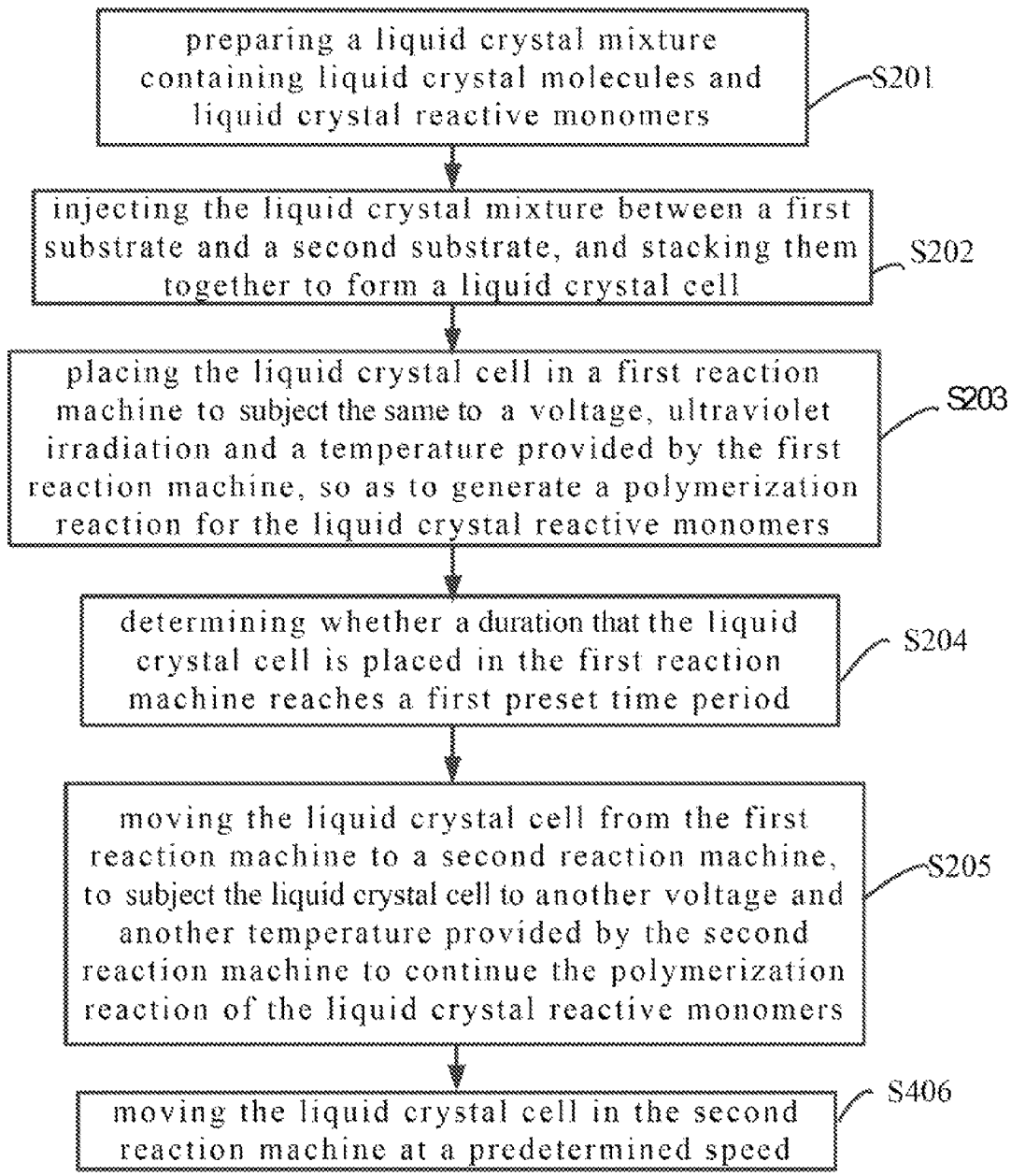
FIG. 4 is a schematic flow chart for manufacturing an alignment film provided by embodiment 2 of the present invention.

Please refer to FIG. 4, which is a schematic flow chart for manufacturing an alignment film according to an embodiment of the present invention.

Here, the difference with the embodiment 1 is there is no step S206 or S207, and instead there is an additional step S406.

In step S406, moving the liquid crystal cell in the second reaction machine according to a predetermined speed.

Figure 5:
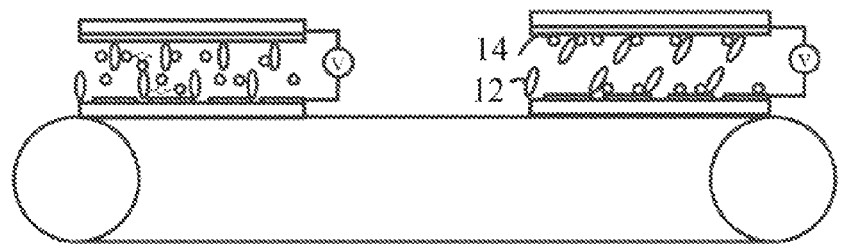
FIG. 5 is a schematic diagram of a second reaction machine provided by embodiment 2 of the present invention.

Please refer to FIG. 5, which is a schematic diagram of a second reaction machine. It should be understood that the first reaction machine is the same as shown in the embodiment 1, expect for the configuration of the second reaction machine, in particular: the second reaction machine comprises a conveyor belt for conveying the liquid crystal cell from an inlet to an outlet of the second reaction machine, and the polymerization reaction of the liquid crystal reactive monomers 14 is completed in the second reaction machine, so that the liquid crystal molecules 12 generate sufficient pre-tilt angle, and no free liquid crystal reactive monomers are presented.

The conveyor belt has a length of 10 to 100 m.

The setting of the conveyor belt length and the predetermined speed are intended to enable the reaction time of the liquid crystal cell in the second reaction machine to reach the second preset time in the embodiment 1.

It should be understood that since the first reaction machine needs to provide ultraviolet radiation in coordination with temperature and voltage to initiate the polymerization reaction of the liquid crystal monomer, the illumination requirement of the ultraviolet radiation is more strict, high-cost instruments with high-precision should be adopted. While the second reaction machine only requires temperature and voltage to continue the polymerization reaction, the second reaction machine can only adopt lower cost general equipment.

The present invention reduces the reaction time in the first reaction machine through a design of the second reaction machine. The second reaction machine has a larger capacity and is also a part of a transport mechanism, such that the second reaction machine can fully use the function of the single transport mechanism, so the unit production time is very low. The bottleneck in producing the alignment films of liquid crystal panel in the first reaction machine is avoided, and overall production efficiency of the liquid crystal panel is improved.

As shown the embodiment 1 and the embodiment 2, the present invention provides a new design for the second reaction machine and the corresponding forming method of the alignment films. It should be understood that the other embodiments such as replacing the ultraviolet radiation with temperature and voltage derived from the above two embodiments are within the spirit of the present invention.

Embodiment 3

Please refer to Table 1, which is a validation result of the alignment film forming method corresponding to the second reaction machine designed by the present invention.

TABLE 1

Experimental data and validation result

| sustain the voltage after UV1 | UV1 | heating time period after UV1 | Pre-tilt angle of the liquid crystal molecules |
|---|---|---|---|
| 0 V | 185 sec | 0 min | 88.4 |
| 0 V | 185 sec | 15 min | 88.4 |
| 10 V | 165 sec | 15 min | 87.6 |
| 10 V | 145 sec | 30 min | 87.3 |

During the experiments, temperature tests are respectively taken by not sustaining the voltage and sustaining the voltage after ultraviolet light (UV1) is provided by the first reaction machine; the temperature of the second reaction machine is 50° C.

As can be seen from the results, when the UV1 time period is the same, if the voltage is not applied after finished the UV1, and the substrate is still retained in the second reaction machine at 50° C. for 15 minutes, the pre-tilt angle is the same as not retaining in the second reaction machine. That is, the pre-tilt angle cannot be formed when the voltage is not applied.

The UV1 time period is respectively shortened to 165 seconds and 145 seconds, keep the voltage constant after UV1 is finished, a pre-tilt angel greater than that without shortening the UV 1 time period can be achieved when the substrate retained in the second reaction machine at 50° C. for 15 minutes and 30 minutes, respectively.

Therefore, it is possible to replace partial functions of the UV1 with the effect of appropriate time and temperature, so as to obtain the same pre-tilt angle.

It should be understood that although various embodiments have different emphasis, the design idea is the same. Certain embodiments without detailed descriptions can refer to the detailed description of the full text, which are not repeated herein.

The embodiments were chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present invention is defined by the appended claims rather than the foregoing description and the exemplary embodiments described therein.

What is claimed is:

1. A method for manufacturing alignment films of liquid crystal panel, comprising the following steps:
   injecting a liquid crystal mixture between a first substrate and a second substrate, and stacking them together to form a liquid crystal cell, the liquid crystal mixture comprising liquid crystal molecules and liquid crystal reactive monomers;
   placing the liquid crystal cell in a first reaction machine to subject the same to a voltage, ultraviolet irradiation, and a temperature provided by the first reaction machine, so as to generate a polymerization reaction for the liquid crystal reactive monomers, wherein the voltage provided by the first reaction machine is 7V to 50V, an illuminance of the ultraviolet irradiation is 0.05 to 120 mW/cm², and the temperature is 25° C. to 80° C.;
   determining whether a duration that the liquid crystal cell is placed in the first reaction machine reaches a first preset time period;
   moving the liquid crystal cell from the first reaction machine to a second reaction machine if the first preset time period is reached, to subject the liquid crystal cell to another voltage and another temperature provided by the second reaction machine to continue the polymerization reaction of the liquid crystal reactive monomers, wherein the voltage provided by the second reaction machine is 1V to 50V, and the temperature is 10° C. to 100° C.;
   determining whether a duration that the liquid crystal cell is placed in the second reaction machine reaches a second preset time period; and
   moving the liquid crystal cell out of the second reaction machine if the second preset time period is reached, to form alignment films on inner surfaces of the first substrate and the second substrate, respectively.

2. The method for manufacturing alignment films claimed in claim 1, wherein the second reaction machine comprises a conveyor belt for conveying the liquid crystal cell from an inlet to an outlet of the second reaction machine, and the polymerization reaction is completed in the second reaction machine.

3. The method for manufacturing alignment films claimed in claim 2, wherein the conveyor belt has a length of 10 to 100 m.

4. The method for manufacturing alignment films claimed in claim 1, wherein the second reaction machine is a multilayered structure furnace having 10 to 100 layers therein.

5. The method for manufacturing alignment films claimed in claim 1, wherein before the step of injecting the liquid crystal mixture between the first substrate and the second substrate, the method further comprises: preparing the liquid crystal mixture, wherein the proportion of the liquid crystal reactive monomers in the liquid crystal mixture is 2000 to 5000 ppm.

6. The method for manufacturing alignment films claimed in claim 5, wherein the liquid crystal reactive monomers are aromatic compounds.

7. The method for manufacturing alignment films claimed in claim 6, wherein the step of stacking the liquid crystal cell further comprises:
   offsetting the first substrate and the second substrate a predetermined distance to expose a voltage contact point on the second substrate for receiving the voltage provided by the first reaction machine or the second reaction machine.

8. The method for manufacturing alignment films claimed in claim 1, wherein after the liquid crystal reactive monomers generate the polymerization reaction, further comprising the steps of:
   moving the liquid crystal reactive monomers toward the first substrate or the second substrate and forming protrusions; and
   forming a pre-tilt angle of the liquid crystal molecules under the effect of the protrusions.

9. A method for manufacturing alignment films of liquid crystal panel, comprising the following steps:
   injecting a liquid crystal mixture between a first substrate and a second substrate, and stacking them together to form a liquid crystal cell, the liquid crystal mixture comprising liquid crystal molecules and liquid crystal reactive monomers;

placing the liquid crystal cell in a first reaction machine to subject the same to a voltage, ultraviolet irradiation, and a temperature provided by the first reaction machine, so as to generate a polymerization reaction for the liquid crystal reactive monomers;

determining whether a duration that the liquid crystal cell is placed in the first reaction machine reaches a first preset time period;

moving the liquid crystal cell from the first reaction machine to a second reaction machine if the first preset time period is reached, to subject the liquid crystal cell to another voltage and another temperature provided by the second reaction machine to continue the polymerization reaction of the liquid crystal reactive monomers, and forming alignment films on inner surfaces of the first substrate and the second substrate, respectively.

10. The method for manufacturing alignment films claimed in claim 9, wherein the second reaction machine comprises a conveyor belt for conveying the liquid crystal cell from an inlet to an outlet of the second reaction machine, and the polymerization reaction is completed in the second reaction machine.

11. The method for manufacturing alignment films claimed in claim 10, wherein the conveyor belt has a length of 10 to 100 m.

12. The method for manufacturing alignment films claimed in claim 9, wherein the second reaction machine is a multilayered structure furnace having 10 to 100 layers therein.

13. The method for manufacturing alignment films claimed in claim 12, further comprising the following steps:

determining whether a duration that the liquid crystal cell is placed in the second reaction machine reaches a second preset time period; and moving the liquid crystal cell out of the second reaction machine if the second preset time period is reached.

14. The method for manufacturing alignment films claimed in claim 9, wherein the voltage provided by the first reaction machine is 7V to 50V, an illuminance of the ultraviolet irradiation is 0.05 to 120 mW/cm$^2$, and the temperature is 25° C. to 80° C.;

the voltage provided by the second reaction machine is 1V to 50V, and the temperature is 10° C. to 100° C.

15. The method for manufacturing alignment films claimed in claim 9, wherein before the step of injecting the liquid crystal mixture between the first substrate and the second substrate, the method further comprises: preparing the liquid crystal mixture, wherein the proportion of the liquid crystal reactive monomers in the liquid crystal mixture is 2000 to 5000 ppm.

16. The method for manufacturing alignment films claimed in claim 15, wherein the liquid crystal reactive monomers are aromatic compounds.

17. The method for manufacturing alignment films claimed in claim 16, wherein in the step of stacking the liquid crystal cell, further comprising:

offsetting the first substrate and the second substrate a predetermined distance to expose a voltage contact point on the second substrate for receiving the voltage provided by the first reaction machine or the second reaction machine.

18. The method for manufacturing alignment films claimed in claim 9, wherein after the liquid crystal reactive monomers generate the polymerization reaction, further comprising the steps of:

moving the liquid crystal reactive monomers toward the first substrate or the second substrate and forming protrusions; and forming a pre-tilt angle of the liquid crystal molecules under the effect of the protrusions.

* * * * *